April 13, 1954     P. J. DE PASQUALE     2,674,960

METHOD OF PRODUCING FROZEN COMESTIBLES

Filed May 4, 1949     2 Sheets-Sheet 1

INVENTOR.
PATRICK J. DE PASQUALE
BY
Louis V. Lucia
ATTORNEY.

April 13, 1954     P. J. DE PASQUALE     2,674,960
METHOD OF PRODUCING FROZEN COMESTIBLES Filed May 4, 1949     2 Sheets-Sheet 2

INVENTOR.
PATRICK J. DE PASQUALE
BY
*Louis V. Lucia*
ATTORNEY.

Patented Apr. 13, 1954

2,674,960

UNITED STATES PATENT OFFICE 2,674,960

METHOD OF PRODUCING FROZEN COMESTIBLES

Patrick J. De Pasquale, Hartford, Conn.

Application May 4, 1949, Serial No. 91,297

1 Claim. (Cl. 107—54)

This invention relates to a method of producing frozen comestibles, such as ice cream and the like, and more particularly for producing spumoni ice cream which commonly consists of a plurality of layers of frozen, contrasting, edible material.

It is highly desirable that a novel form of frozen comestible be produced having a plurality of internally confined shells or layers of contrasting material so to provide a pleasing effect in the body of the article and also to present a novel and attractive exterior appearance thereto.

Such articles have heretofore been produced by first forming the entire body and then boring out the center thereof or by molding the outer shell by hand and then filling it with a contrasting material. At best, only one contrasting material has heretofore been provided and the same has been entirely contained within the outer layer or shell of the frozen article so that inner contrasting formations have not been visible upon the exterior of the article. Further, the methods heretofore used for producing such comestible articles containing a plurality of internal layers of contrasting material have been complicated and time consuming and unsanitary.

A still further object of this invention is to provide a novel, sanitary and highly efficient method for expediting the production of such frozen articles and producing a variety of contrasts intercontained within the body of the article and also showing upon the exterior surface thereof.

Further objects and advantages of my invention will be more clearly understood from the following description and the accompanying drawings in which.

Figure 1:
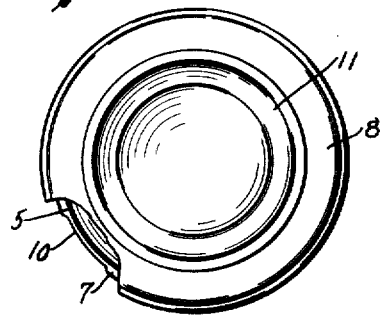
Fig. 1 is a plan view of a mold embodying my invention.
Figure 2:
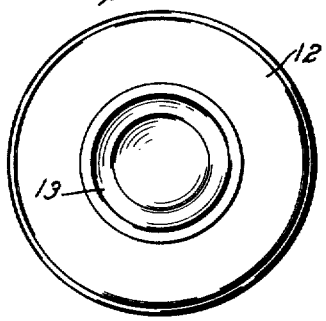
Fig. 2 is a similar view, but showing the said mold with a different member used thereon.
Figure 3:
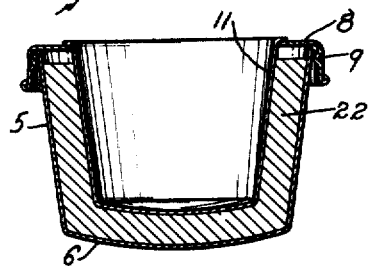
Fig. 3 is a side view, in central vertical section, showing the said mold as used with a first cavity forming member therein and also showing the mold filled with the outer layer of material.
Figure 4:
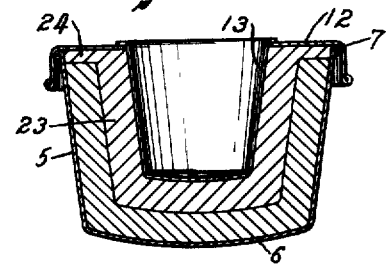
Fig. 4 is a similar view showing said mold as used with a second cavity forming member therein and also showing said mold filled with an inner layer of a contrasting material which extends to the exterior surface of the outer layer.
Figure 5:
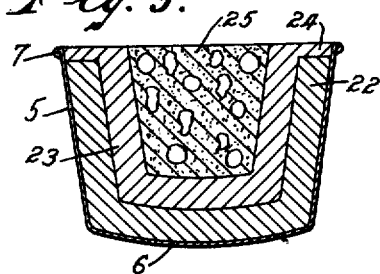
Fig. 5 is a similar view showing the mold cover and the inner cavity forming member removed and the core cavity filled with the core material.

As shown in Figs. 1 to 8 of the drawings, my improved mold comprises a container 5 which is preferably formed with upwardly diverging walls and a concavo-convex bottom 6. The said container is preferably provided with a surrounding bead 7, along the free edge of the surrounding wall thereof, which fits within an inverted cup shaped first cover 8, preferably having detents 9 in the side walls thereof adapted to pass through notches 10 in the bead 7 and engage the underside of the said bead for securing the cover to the container as shown in Fig. 3.

The cover 8 is preferably annular in shape and has an axial projection thereon formed by means of a first cavity forming member 11 which normally depends from the cover 8 into the container 5 and is evenly spaced from the said container to provide a material receiving space between the said cavity forming member and the inner surface of the container walls 5 and bottom 6.

A second cover 12 is provided with a second cavity forming member 13 as shown. This second cavity forming member is smaller than the first member 11 and of a relative size to provide a material receiving space between the said second member and the inner surface of the cavity formed by the first member 11.

Figure 6:
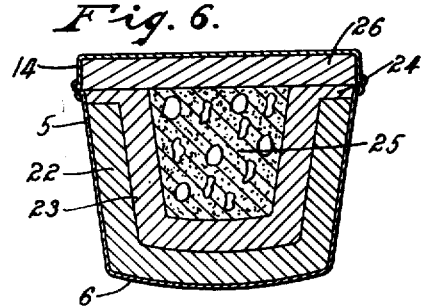
Fig. 6 is a similar view showing a base or cap placed in position upon the body of the molded article.

In addition to the above described members and container, there is also provided a base forming cup shaped member 14 which is adapted to rest upon the free edges of the container member 5 as clearly illustrated in Fig. 6.

Figure 9:
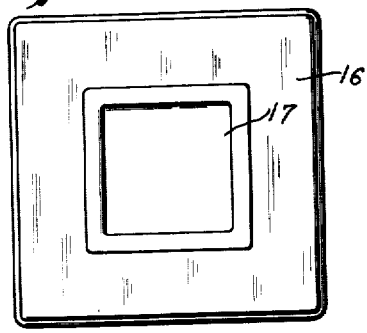
Fig. 9 is a plan view of a modified form of mold embodying my invention.
Figure 10:
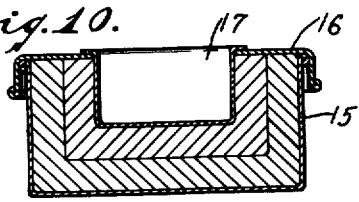
Fig. 10 is a side view, in central vertical section showing a partly formed article with two contrasting materials therein.

In the form illustrated in Figs. 9 and 10, my invention provides a mold which is formed to produce an article in the shape of a half-cube and consists of a container 15 and a cover 16 having a cavity forming member 17 depending therefrom.

Figure 12:
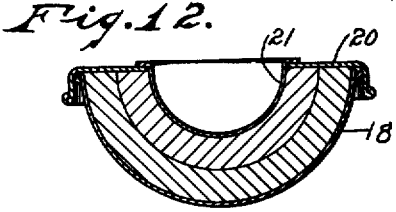
Fig. 12 is an end view, in central vertical section, showing a further modified form of a mold.
Figure 13:
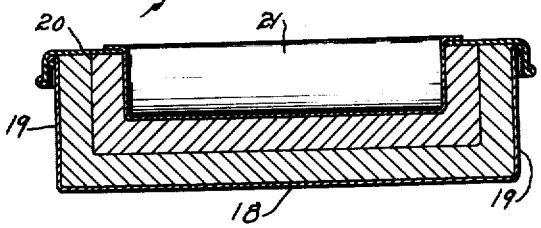
Fig. 13 is a side view thereof in central vertical section.
Figure 14:
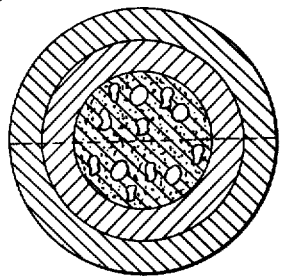
Fig. 14 is an end view, in central vertical section, of a comestible article as produced with the mold as illustrated in Figs. 12 and 13.

In the form illustrated in Figs. 12 and 13, my invention is embodied in a mold for producing a semi-cylindrical body. This mold consists of an outer container 18 having the semi-circular outer wall with flat end walls 19—19. A cover 20 fits over the said outer end walls and has a depending inner cavity forming member 21 secured thereto.

Figure 7:
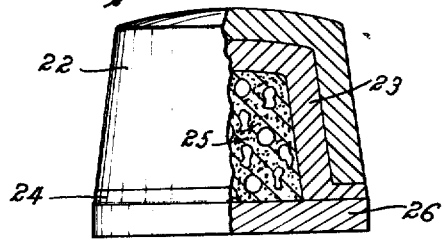
Fig. 7 is a side view, partly in vertical section, showing the completed article of frozen material in one form.
Figure 8:
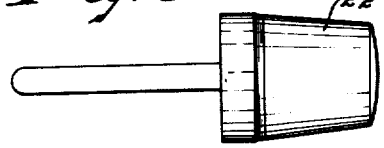
Fig. 8 is a side view showing the said article with a stick or handle inserted thereinto.

The method of producing frozen comestibles of the form shown in Fig. 7 is as follows:

The container 5 is first filled to a predetermined level with a desired material in a substantially flowable state for an outer portion or layer 22. The cover with the first cavity forming member 11 is then placed upon the container 5 with the said member depending downwardly thereinto as illustrated in Fig. 3. This will cause the material in the container to rise in the space between the said member 11 and the container 5 and fill the said container to a level below the upper edge thereof so as to provide a space between the upper surface of the material and the bottom of the cover 8.

The said container with the outer layer of material 22 and the first cavity forming member 11 therein is then placed within a freezing compartment and the material 22 is permitted to freeze to a substantially hard state. The mold is then taken from the freezing compartment and the member 11 is filled with hot water, or steamed, so as to free it from the frozen material, and the cover 8 with said member 11 thereon is then removed from the mold. This leaves the material 22 as a lining within the container 5. The inner cavity in the frozen material 22 is then filled with a second or intermediate layer of contrasting edible material 23, in a substantially flowing state, and the cover 12 with the second cavity forming member 13 is placed upon the mold. This displaces the material 23 and fills the mold up to the bottom of the cover 12 and provides portions 24 of the said second layer of material which project over the edge of the outer layer 22 to the wall of the container 5. The said container 5, with the second layer of material therein is then placed in the freezing compartment and the material is permitted to also freeze to a hard state.

The mold is then again withdrawn from the freezing compartment and the member 13 is filled with hot water to free it from the material 23. The cover 12 with the member 13 thereon is then removed and the inner cavity of the lining 23 is filled with a core of contrasting edible material indicated at 25. The mold cover 14 with the base or plate of edible material 26, which has been prefrozen, is then placed upon the top of the mold and the entire unit is then placed in the freezing compartment so that the material 25 is permitted to freeze and the material of the base 26 will become united to the rest of the material in the mold and thus complete the article.

The completed article may now be removed from the mold when desired by simply warming the members 5 and 14 and withdrawing the molded article therefrom.

It will be understood that when the body of the said article is completed by the method above described, it will present the appearance illustrated in Fig. 7 wherein there will be three contrasting colors which include the base 26, the surrounding band on the body formed by the overlapping material 33, and the first layer or outer covering 22.

My improved method as above described permits the formation of frozen desserts, in the form of spumoni or the like, having any desired number of intercontained layers of contrasting materials which may either show upon the exterior surface or be entirely imbedded within the outer layers as desired. My improved method therefore produces such frozen articles of edible material which are pleasing in appearance and which are immensely fascinating to the eater due to the interest which is attracted by the uncovering of the different contrasting portions as the article is consumed.

Figure 11:
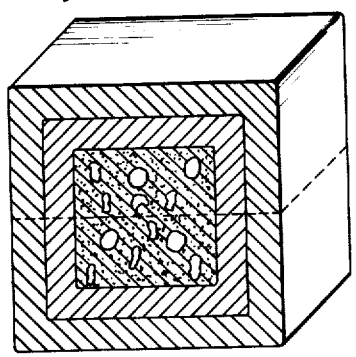
Fig. 11 is a perspective view, in central vertical section, showing the modified form of comestible article produced with the use of the mold illustrated in Fig. 9.

In the modified form of my invention illustrated in Figs. 9 to 11, one-half of a cube may be produced in the mold which consists of the container 15 and the intermediate core forming members which are used in the same manner as above described. Two of said halves are then united into the form shown in Fig. 11 which then will comprise an outer shell of material and intercontained layers of contrasting material. The said intercontained layers being contained entirely within the outer layer.

The method for producing the form illustrated in Fig. 12 is similar to that used for producing the cube illustrated in Fig. 11, but the mold is so formed as to produce the body of frozen material in the form of a cylinder having first and second layers of contrasting material.

It will also be noted that my improved method and mold producing frozen comestibles alleviates the necessity of touching the product with the hands and, therefore, permits the production of such comestibles in a most sanitary manner.

The particular method of using my improved molds as above described is not limited to the production of frozen food products, but may be also used in the same manner to produce desserts of gelatin and the like.

I claim:

The method of forming an edible article which comprises inserting a pre-determined amount of material into a mold and forming therefrom a cup-shaped layer reaching to a height below the top of the mold, causing said layer to congeal, inserting a different material into the congealed layer and forming therefrom an inner cup-shaped layer with a flange extending outwardly over the top of the congealed layer, causing said inner layer to congeal, inserting a core material in said inner layer, placing a pre-congealed plate of material into engagement with said core material and flange, and then causing said core material to congeal.

References Cited in the file of this patent

UNITED STATES PATENTS

| Number | Name | Date |
|---|---|---|
| 502,864 | Rosenberger | Oct. 8, 1893 |
| 1,472,229 | Plempel | Oct. 30, 1923 |
| 1,560,205 | Cassell | Nov. 3, 1925 |
| 1,621,010 | Hall | Mar. 15, 1927 |
| 1,790,361 | Winkler et al. | Jan. 27, 1931 |
| 1,852,966 | Green | Apr. 5, 1932 |
| 1,987,084 | Snodgrass | Jan. 8, 1935 |
| 2,048,364 | Willems | July 21, 1936 |
| 2,087,729 | Cowling | July 20, 1937 |
| 2,123,215 | Thomas | July 12, 1938 |
| 2,179,225 | Thomas | Nov. 7, 1939 |
| 2,289,326 | Howser | July 7, 1942 |
| 2,316,165 | Howser | Apr. 3, 1943 |
| 2,410,110 | Taylor | Oct. 29, 1946 |
| 2,534,059 | Ricciardi | Dec. 12, 1950 |

FOREIGN PATENTS

| Number | Country | Date |
|---|---|---|
| 242,733 | Great Britain | Nov. 26, 1925 |